Feb. 12, 1924.

W. MARTENS 1,483,364

POROUS FILTER

Filed Dec. 30, 1920

Inventor
William Martens
by Orwig & Hogue Attys

Patented Feb. 12, 1924.

1,483,364

UNITED STATES PATENT OFFICE.

WILLIAM MARTENS, OF ACKLEY, IOWA.

POROUS FILTER.

Application filed December 30, 1920. Serial No. 434,087.

*To all whom it may concern:*

Be it known that I, WILLIAM MARTENS, a citizen of the United States, and resident of Ackley, in the county of Hardin and State of Iowa, have invented a certain new and useful Porous Filter, of which the following is a specification.

The object of my invention is to provide a new and improved filter of simple, durable and inexpensive construction, especially adapted to be used on the lower end of a suction pipe for pumps.

More particularly it is the object of my invention to provide a porous filter designed to be attached to the lower end of a pump pipe without the use of packing, and so constructed that it may be quickly and easily attached thereto.

These and other objects which need not be mentioned in detail, will be apparent to those skilled in the art.

My invention consists in the construction, arrangement and combination of the various parts of the device, whereby the objects contemplated are attained, as hereinafter more fuly set forth, pointed out in my claims, and illustrated in the accompanying drawings, in which:

My improved filter comprises preferably a cylindrical member 10, formed of a porous material, such as cement and sand substantially in the proportion of three parts sand and one part cement. The mixture is placed in a mold and lightly tamped, the said mold being so arranged that annular recesses 11 are provided at each end of the cylindrical member 10. These recesses are larger at their inner edges than their outer edges, so that the beveled head members 12 and 13 may be poured or cast into position, and when so placed in position will be held against outward movement.

Figure 2:
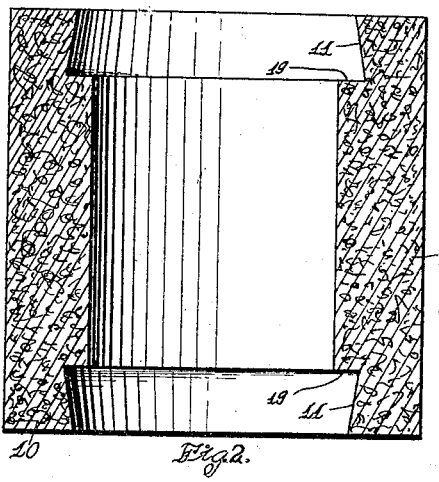
Figure 2 is a sectional view of the casing member before the heads have been applied.

After the cement of the cylindrical member 10 has set, it is then removed from the mold and has the form shown in Figure 2. This cylindrical or casing member 10 may have the form of a polygon or any other desired shape having one or more openings.

Figure 3:
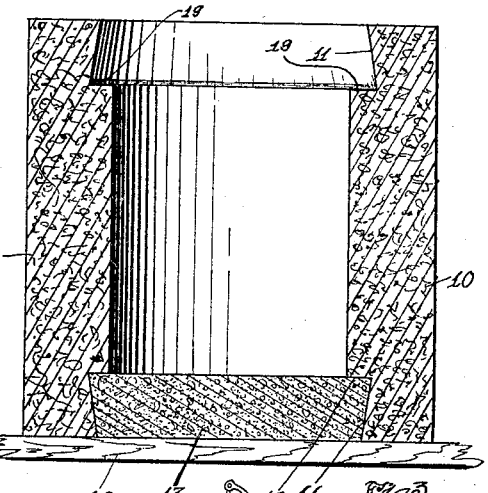
Figure 3 is a sectional view showing the manner in which one of the heads is cast in position.

After the member 10 has been removed from the mold, I place one end on a pallet 14, which may be constructed of wood or of any other desirable material. When the member 10 is so placed, I pour a rich mixture of semi-plastic cement through the upper end of the member 10 until it has filled the lower end of the recesses 11, as clearly shown in Figure 3. This mixture of cement is made in a proportion of one to two, or one to three parts cement and sand, and thin enough so that when poured it will run in position in the annular groove 11 and have its upper edge seek a level position, thus making a comparatively smooth inner face. The outer face of the member 13 will be even with the ends of the member 10. The casing 10 is left in position on the pallet 14 until the cement of the head member 10 has hardened.

For forming the upper head member, I have provided a circular disk 15, which is of a diameter slightly less than that of the recesses 11, but of a larger diameter than the opening through the casing 10. The disk 15 is provided with an opening 16, which is designed to receive a pipe 17 which is screw-threaded at one end and provided with a lock nut 18 to prevent the said pipe 17 from moving downward through the said opening. The disk 15 is placed on the bottom of the recesses 11 and designed to rest on the upper end of the inner opening which forms shoulders 19. The lock nut 18 is designed to rest against the said plate 15, while one end of the pipe 17 extends downwardly to a point near the head 13. The other end of the pipe 17 projects upward and is of a length somewhat greater than the width of the recesses 11.

Figure 1:
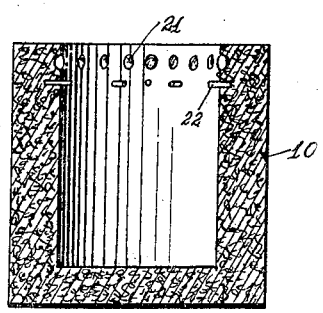
Figure 1 is a longitudinal sectional view of my improved filter.

For rigidly holding the pipe 17 in position, I have provided an anchoring pin 20, which is driven through holes in the sides of the pipe 17 and placed at a position slightly above the lock nut 18. After the disk 15 is placed in position with the pipe 17 through the openings 16 and the lock nut 18 against the plate 15, as shown in Figure 1, I fill the recess 11 with a cement mixture similar to that with which the lower recess was filled. This process of filling the recess 11 with semi-plastic cement is termed "casting" in the claims for the sake of convenience.

When the head member 12 is formed as above described, and becomes hardened, it will be held rigidly in position in the ends of the member 10 and also at the same time rigidly secure the pipe 17 in position where it will be held against being worked loose, by means of the pin 20 and the lock nut 18. The purpose of the disk 15 is merely to act as a form to prevent the plastic cement from entering the interior of the casing while being cast. The upper end of the pipe 17 projects above the head member 12, which is of a size in diameter equal to the diameter of the pump pipe. It may be secured to the lower end of the pump pipe by means of the ordinary pipe fixtures in common use.

Thus it can be seen that I have provided a filter device which is very strong, which will not decay or rust, and which is provided with a suction pipe which may be easily and quickly attached to the lower end of the pump pipe with ordinary fixtures, the said suction pipe being so mounted in the head 12 that it will not work loose and will not leak water around the pipe, and therefore requires no packing at this point.

The casing member 10 when properly tamped and formed of the proper mixture of cement and sand will be very porous and will permit water to filter through and will exclude all dirt and foreign substances. The head members 11 and 12 are, however, of a richer mixture of cement with the sand, and for that reason are very strong and are not intended to act as a filter to any very great extent.

Figure 4:
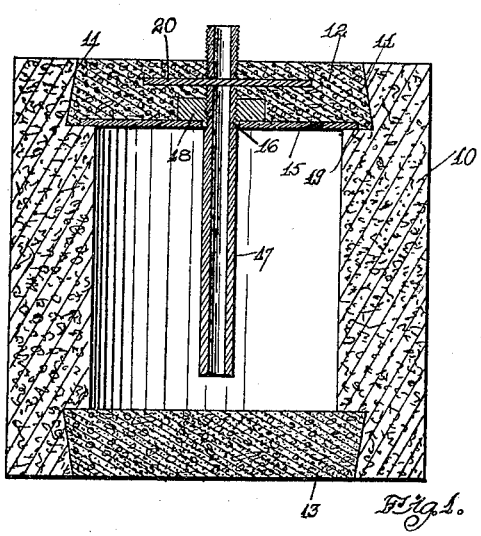
Figure 4 is a detail sectional view showing a slightly modified form of the casing member.
Figure 5:
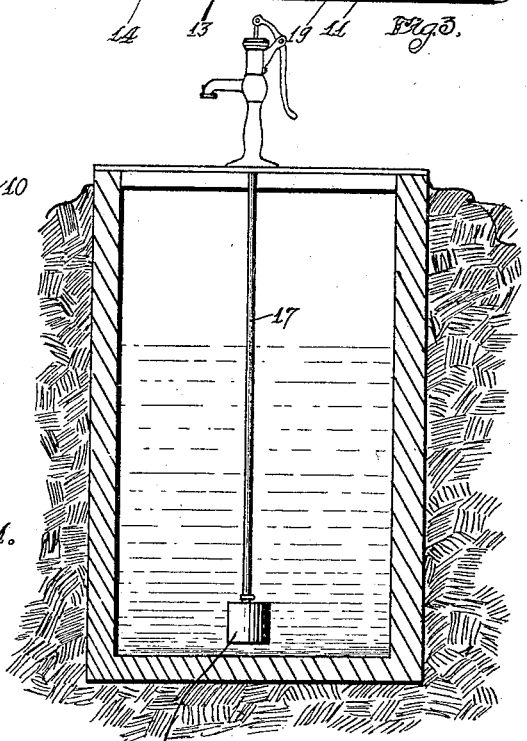
Figure 5 is a sectional view of a cistern showing the manner in which my improved filter is applied on the lower end of the pump pipe.

In Figure 4 of the drawings I have shown a slightly modified form of the casing 10, in which one end of the said casing is cast integral with the sides and of the same mixture. In this case the said end member acts as a filter the same as the sides. The upper end of the interior of said casing is provided with recesses 21, which are designed to take the place of the annular recesses 11. The disk 15 may be held in position by means of short pins 22. After the said disk is placed in position the upper head is then formed as before described. I, however, prefer the form shown in Figure 1, for the reason that the casing 10 may be made on a machine similar to those used for making cement tile and thereby constructed at a considerably smaller cost than could be done with the molding method.

Thus it will be seen that I have provided a filter which may be easily and quickly attached to the lower end of the pump pipe, which is very economical to build and which will not get out of order or need attention.

Some changes may be made in the composition and construction of my improved filter without departing from the real purpose and spirit of my invention, and it is my intention to cover by my claims any modified forms of structure, or the proportions of or kinds of material used in the porous members, which may be reasonably included within their scope.

I claim as my invention:

1. A filter for pump pipes formed of a porous hollow casing having one end closed and the other end formed open, a plate to cover the said open end, a pipe extending through said plate from the exterior to the interior of said casing, the inner end extending adjacent to the interior closed end of said casing, means for locking said pipe to said plate, said plate being secured to the said casing, the said pipe being secured to the said casing by a plastic material capable of hardening and anchoring the same.

2. A filter for pump pipes formed of a porous hollow casing having one end open, said open end being provided with an annular recess, a disk for said recess, a suction pipe through said disk, means for locking said pipe to said disk, the disk being so placed that a cavity is formed in the casing, said cavity being designed to receive a semi-plastic and hardening material to cast all of said parts into a unitary head member.

3. A filter for pump pipes, formed of a porous hollow casing having open ends, each end being provided with an annular recess, one of said ends being provided with a head cast in said recess, and the other end provided with a disk, and a suction pipe through said disk, said pipe being provided with a lock nut and an anchoring pin, the said disk being so placed that a cavity is formed in the said casing, said cavity being designed to receive a semi-plastic and hardening material, to cast all of said parts into a unitary head member.

Des Moines, Iowa, November 19, 1920.

WILLIAM MARTENS.